(12) United States Patent
Park et al.

(10) Patent No.: US 12,116,298 B2
(45) Date of Patent: Oct. 15, 2024

(54) METHOD FOR REMOVING NITROGEN AND PHOSPHORUS FROM SEWAGE AND WASTEWATER THROUGH COMBINATION OF BIOLOGICAL NITROGEN AND PHOSPHORUS REMOVAL PROCESS USING NITRITE NITROGEN AND ANAEROBIC AMMONIUM OXIDATION PROCESS (ANAMMOX)

(71) Applicants: BKT CO., LTD., Daejeon (KR); SUDOKWON LANDFILL SITE MANAGEMENT CORPORATION, Incheon (KR)

(72) Inventors: Young Hyun Park, Busan (KR); Dae Hwan Rhu, Yeoju-si (KR); Min Ki Jung, Daejeon (KR); Jae Min Kim, Sejong (KR); Jonathan Liberzon, Long Beach (CA); Jong Cheol Won, Suwon-si (KR); Joon Ho Cho, Goyang-si (KR); Swong Kyun Hong, Incheon (KR); Moon Jeong Kim, Seoul (KR); Kyung Sam Jeong, Incheon (KR); Min Hyuk Kim, Incheon (KR); June Woo Lee, Seoul (KR)

(73) Assignees: BKT CO., LTD., Daejeon (KR); SUDOKWON LANDFILL SITE MANAGEMENT CORPORATION, Incheon (KR)

( * ) Notice: Subject to any disclaimer, the term of this patent is extended or adjusted under 35 U.S.C. 154(b) by 450 days.

(21) Appl. No.: 17/565,978

(22) Filed: Dec. 30, 2021

(65) Prior Publication Data
US 2022/0144678 A1  May 12, 2022

Related U.S. Application Data

(63) Continuation of application No. PCT/KR2020/008657, filed on Jul. 2, 2020.

(30) Foreign Application Priority Data

Jul. 3, 2019 (KR) .................. 10-2019-0080399

(51) Int. Cl.
*C02F 3/30* (2023.01)
*C02F 3/34* (2023.01)
(Continued)

(52) U.S. Cl.
CPC .............. *C02F 3/307* (2013.01); *C02F 3/308* (2013.01); *C02F 3/341* (2013.01); *C02F 2101/105* (2013.01); *C02F 2101/16* (2013.01)

(58) Field of Classification Search
CPC .......... C02F 3/307; C02F 3/308; C02F 3/341; C02F 2101/105; C02F 2101/16
See application file for complete search history.

(56) References Cited

FOREIGN PATENT DOCUMENTS

| KR | 10-2001-0028550 | 4/2001 |
| KR | 10-0701524 | 3/2007 |

(Continued)

OTHER PUBLICATIONS

English Specification of 10-2011-0059691.
(Continued)

*Primary Examiner* — Waqaas Ali
(74) *Attorney, Agent, or Firm* — Dinsmore & Shohl LLP; Yongsok Choi, Esq.

(57) ABSTRACT

Disclosed is a method for removing nitrogen and phosphorus from sewage and wastewater through a combination of a biological nitrogen and phosphorus removal process using nitrite nitrogen and an anaerobic ammonium oxidation process. An objective of an embodiment of the present invention is to provide an apparatus for removing nitrogen and phosphorus in which, by inducing a denitritation- and nitritation-based biological nitrogen and phosphorus removal
(Continued)

process in a bioreactor and applying an anaerobic ammonium oxidation process, nitrogen and phosphorus can be economically and effectively removed without separately injecting organic materials.

1 Claim, 5 Drawing Sheets

(51) Int. Cl.
*C02F 101/10* (2006.01)
*C02F 101/16* (2006.01)

(56) References Cited

FOREIGN PATENT DOCUMENTS

| KR | 100701524 B1 * | 3/2007 |
| KR | 10-2011-0059691 | 6/2011 |
| KR | 20110059691 A * | 6/2011 |
| KR | 10-2013-0003238 | 1/2013 |
| KR | 10-1828296 | 2/2018 |
| KR | 101828296 B1 * | 2/2018 |

OTHER PUBLICATIONS

English Specification of 10-0701524.
English Specification of 10-1828296.
English Specification of 10-2001-0028550.
English Specification of 10-2013-0003238.

* cited by examiner

METHOD FOR REMOVING NITROGEN AND PHOSPHORUS FROM SEWAGE AND WASTEWATER THROUGH COMBINATION OF BIOLOGICAL NITROGEN AND PHOSPHORUS REMOVAL PROCESS USING NITRITE NITROGEN AND ANAEROBIC AMMONIUM OXIDATION PROCESS (ANAMMOX)

CROSS-REFERENCE TO RELATED APPLICATION

The instant U.S. patent application is a continuation of International Patent Application No. PCT/KR2020/008657, filed on Jul. 2, 2020, which claims priority under 35 U.S.C. 119(a) to Korean Patent Application No. 10-2019-0080399, filed on Jul. 3, 2019, in the Korean Intellectual Property Office, the disclosures of which are herein incorporated by reference in their entireties.

TECHNICAL FIELD

The present invention relates to a device for efficiently combining anammox bacteria and nutrient removal bacteria in denitritation/nitritation processes to remove nitrogen and phosphorus contained in sewage and wastewater.

DESCRIPTION OF RELATED ART

The description of the Discussion of Related Art section merely provides information that may be relevant to embodiments of the disclosure but should not be appreciated as necessarily constituting the prior art.

Sewage and wastewater generated from landfills contain high concentrations of nutrients, such as nitrogen and phosphorus, as well as organic matter. If sewage and wastewater are discharged, the water quality of the discharged water system will be seriously degraded, so nutrients in sewage and wastewater need to be efficiently removed.

Conventional nitrogen and phosphorus removal methods remove nitrogen in sewage and wastewater by nitrification and denitrification and remove phosphorus by releasing and up-taking it. A conventional nitrogen and phosphorus removal method consists of an anaerobic tank, an anoxic tank, an aerobic tank, and a solid-liquid separator.

Sludge is introduced from the solid-liquid separator into the anaerobic tank and, at this time, nitrate nitrogen having the same concentration as in the aerobic tank is introduced as well. The introduced nitrate nitrogen is first removed by a denitrification reaction. Simultaneously, the bacteria in the anaerobic tank release phosphorus. Releasing of phosphorus is to obtain energy for accumulating biodegradable soluble organic matter, remaining after denitrification by bacteria, into the cells. Accordingly, the concentration of phosphorus ($PO_4^{3-}$) in the anaerobic tank increases rapidly.

The anoxic tank uses the organic matter remaining after the anaerobic reaction as an electron donor, denitrifying the nitrate nitrogen ($NO_3^-$—N) returned from the aerobic tank to nitrogen gas ($N_2$) and removing it. In this case, the nitrogen removal efficiency in the anoxic tank is determined by the amount returned to the anoxic tank. The amount of organic matter and retention time required for denitrification need to be sufficiently secured in the anoxic tank so as to fully denitrify the nitrate nitrogen returned to the anoxic tank by internal return.

The aerobic tank performs a nitrification process to convert the ammonia nitrogen ($NH_4^+$—N) in the introduced sewage and wastewater into nitrate nitrogen($NO_3^-$—N), and the oxidized nitrogen is returned to the anoxic tank.

As described above, the bacteria in the anaerobic tank excessively accumulates phosphorus in the cells using the energy obtained by oxidizing the organic matter accumulated in the cells. The solid-liquid separator receives phosphorus-accumulated bacteria and discharges it in the form of waste sludge, thereby removing phosphorus.

Further, the aerobic tank is operated to be able to achieve 100% nitrification efficiency of ammonia nitrogen. This is because, if the nitrification rate is 100% or less, the nitrogen removal efficiency is also reduced. In other words, when the nitrification rate is 100% or less, the returned amount needs to be increased to maintain the nitrogen removal efficiency. However, an increase in the returned amount causes an increase in the capacity of the returning pump, resulting in economic inefficiency.

Meanwhile, as the sludge is returned from the solid-liquid separator, nitrate nitrogen in the sludge is introduced into the anaerobic tank. The anaerobic tank consumes biodegradable soluble organic matter in sewage and wastewater and performs a denitrification reaction. When the concentration of organic matter in sewage and wastewater is low, organic matter is first removed in denitrification. Accordingly, the phosphorus removal efficiency in the anaerobic tank may reduce.

SUMMARY

An embodiment of the present invention aims to provide a nitrogen and phosphorus removal device that may economically and effectively remove nitrogen and phosphorus even without separately injecting organic matter by inducing a denitritation- and nitritation-based biological nitrogen/phosphorus removal process and combining an anaerobic ammonium oxidation process.

According to an aspect of the present invention, there is provided a device for removing nutrients in sewage and wastewater, comprising an anaerobic tank receiving a portion of the sewage and wastewater and releasing phosphorus dissolved in the received portion of the sewage and wastewater, a first anoxic tank performing denitrification by combining nitrite nitrogen with organic matter in the received portion of the sewage and wastewater, an aerobic tank inducing up-taking of the phosphorus released in the anaerobic tank using first bacteria and oxidizing ammonia nitrogen in the received portion of the sewage and wastewater to nitrite nitrogen, a second anoxic tank receiving a rest of the sewage and wastewater and denitrifying the nitrite nitrogen oxidized in the aerobic tank, a re-aeration tank performing re-aeration using air, a solid-liquid separator separating bacteria ingesting the phosphorus in the sewage and wastewater that has passed through the second anoxic tank, and an anaerobic ammonium oxidation tank denitrifying the nitrite nitrogen oxidized in the aerobic tank and ammonia nitrogen not oxidized in the aerobic tank, using second bacteria.

According to an aspect of the present invention, the first bacteria is phosphorus accumulating bacteria (PAB) releasing phosphorus using soluble organic matter.

According to an aspect of the present invention, in the aerobic tank, ammonia oxidizing bacteria (AOB) are dominant.

According to an aspect of the present invention, the second anoxic tank performs the denitrification by combining the organic matter contained in the rest of the received sewage and wastewater with the nitrate nitrogen oxidized in the aerobic tank.

According to an aspect of the present invention, the second anoxic tank maintains a ratio of ammonia nitrogen to nitrite nitrogen in a range of 1:1.1 to 1:1.3.

According to an aspect of the present invention, the aerobic tank returns a portion of the oxidized nitrite nitrogen to the first anoxic tank.

According to an aspect of the present invention, the amount of sewage and wastewater introduced into the anaerobic tank increases as the ratio of organics to nitrogen increases.

As described above, according to an aspect of the present invention, it is possible to effectively remove nitrogen and phosphorus even without separately injecting organic source by inducing a nitrification denitrification-based biological process with a denitration- and nitritation-based nitrogen and phosphorus removal process and combining with an anaerobic ammonium oxidation process.

DETAILED DESCRIPTION

Various changes may be made to the present invention, and the present invention may come with a diversity of embodiments. Some embodiments of the present invention are shown and described in connection with the drawings. However, it should be appreciated that the present disclosure is not limited to the embodiments, and all changes and/or equivalents or replacements thereto also belong to the scope of the present disclosure. Similar reference denotations are used to refer to similar elements throughout the drawings.

The terms "first" and "second" may be used to describe various components, but the components should not be limited by the terms. The terms are used to distinguish one component from another. For example, a first component may be denoted a second component, and vice versa without departing from the scope of the present disclosure. The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the present disclosure. As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the present disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Hereinafter, for convenience of description, nitrogen and phosphorus are specifically described as nutrients but, without being limited thereto, all nutrients having properties similar to those of nitrogen or phosphorus may be applied.

Figure 1:
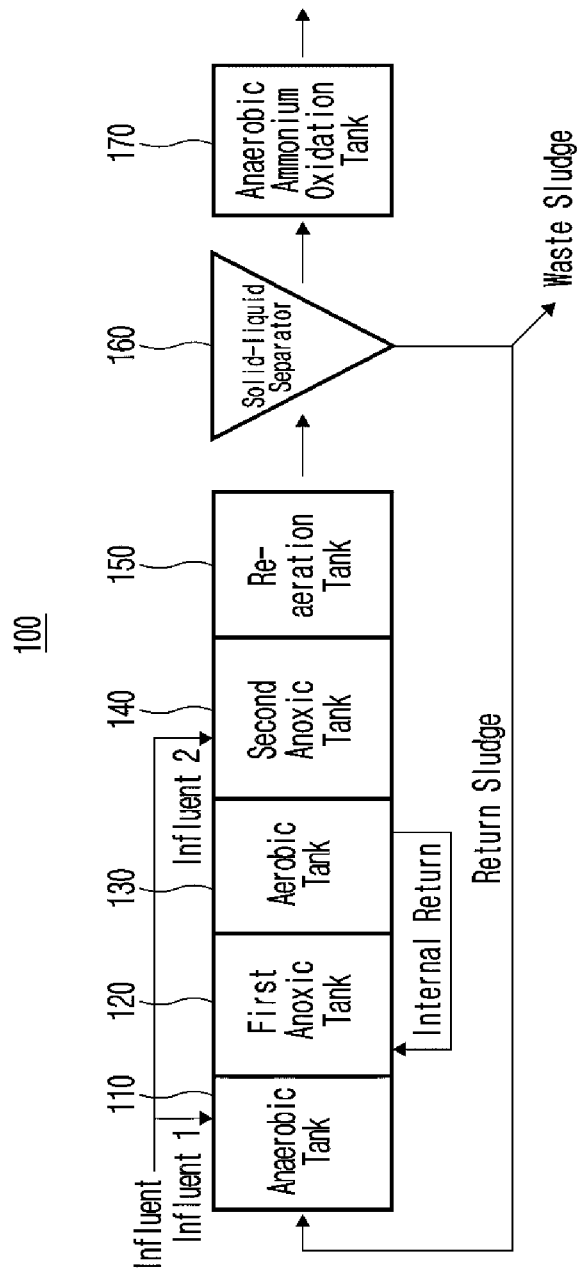
FIG. 1 shows a nitrogen and phosphorus removal device according to an embodiment of the present invention.

FIG. 1 shows a nitrogen and phosphorus removal device according to an embodiment of the present invention.

As illustrated in FIG. 1, a nitrogen and phosphorus removal device 100 includes a primary sedimentation tank (not shown), an anaerobic tank 110, a first anoxic tank 120, an aerobic tank 130, a second anoxic tank 140, a re-aeration tank 150, a solid-liquid separator 160, and an anaerobic ammonium oxidation tank 170.

The primary sedimentation tank (not shown) separates the solids by performing sedimentation on the influent. The treated water from which solids are separated by the primary sedimentation tank (not shown) is introduced as raw water to be treated in the nitrogen and phosphorus removal device 100. In this case, to effectively remove the solids, a chemical may be added to the primary sedimentation tank (not shown).

The treated water in primary tank may be introduced into the anaerobic tank 110 and mixed with the returned sludge, and the anaerobic tank 110 relases phosphorus from the treated water from primary tank using the organic matter dissolved in the influent. In the anaerobic tank 110, phosphorus accumulating bacteria (PAB) releasing phosphorus using the soluble organic matter is present. Accordingly, phosphorus may be released in the anaerobic tank 110, and organic matter in the influent is accumulated in the PAB cells.

The treated water from which the solids are separated is separately introduced into the anaerobic tank 110 and the second anoxic tank 140. The amount of the first influent separated from the primary treatment and introduced into the anaerobic tank 110 varies depending on the concentration of phosphorus in the first influent and the concentration of soluble organic matter in the primary effluent.

The anaerobic tank 110 releases phosphorus using the organic matter dissolved in the influent 1. In the anaerobic tank 110, PAB eluting phosphorus using the soluble organic matter is present. Accordingly, phosphorus may be released in the anaerobic tank 110, and some organic matter in the influent 1 is accumulated in the PAB cells.

In the first anoxic tank 120, denitrification is caused by the combination of organic matter in the influent from the anaerobic tank 110 and nitrite nitrogen returned from the aerobic tank 130. Since the organic matter acts as an electron donor for the nitrite nitrogen, the nitrite nitrogen is denitrified.

The aerobic tank 130 induces up-taking of phosphorus released from the PAB and oxidizes ammonia nitrogen present in the influent, which has passed through the anaerobic tank, to nitrite nitrogen.

The aerobic tank 130 allows the PAB to up-take the phosphorus realeased in the anaerobic tank 110, as does the re-aeration tank 140.

The aerobic tank 130 oxidizes ammonia nitrogen up to nitrite nitrogen, not nitrate nitrogen. Since ammonia oxidizing bacteria (AOB) are dominant in the aerobic tank 130, ammonia nitrogen is oxidized up to nitrite nitrogen.

For the AOB to be dominant in the aerobic tank requires an environment that is favorable to AOB's survival but renders it difficult for nitrite oxidizing bacteria (NOB) to survive. To that end, various factors, such as solid retention time (SRT), dissolved oxygen (DO), free ammonia (FA), free nitrous acid (FNA), and temperature, may be considered. In particular, when the concentration of ammonia nitrogen and pH (related to FA) remain high or DO concentration is low as in landfill leachate, an environment favorable for AOB growth may be formed.

The oxidized nitrite nitrogen is returned to the first anoxic tank 120 or introduced into the second anoxic tank 140 and is then denitrified by combination with organic matter.

Since ammonia nitrogen is oxidized to nitrite nitrogen in the aerobic tank 130, the nitrogen and phosphorus removal device 100 has the advantage that it need not have a separate partial nitritation tank. However, since no separate partial nitritation tank is included, the concentration of nitrite nitrogen oxidized in the aerobic tank 130 need be appropriately adjusted. In addition to being returned to the first anoxic tank 120 or introduced into the second anoxic tank 140, as much nitrite nitrogen oxidized in the aerobic tank 130 as necessary to remove the ammonia nitrogen, remaining unoxidized, in the anaerobic ammonium oxidation tank 170 needs to be introduced into the anaerobic ammonium oxidation tank 170. Therefore, the oxidation in the aerobic tank 130 is performed considering all of the concentration of organic matter remaining after phosphorus releasing in the first anoxic tank 120, the concentration of organic matter introduced into the second anoxic tank 140, the concentration of ammonia nitrogen remaining unoxidized, and the concentration of nitrite nitrogen required for removing the residual ammonia nitrogen in the anaerobic ammonium oxidation tank 170.

In the second anoxic tank 140, nitrite nitrogen in the influent introduced from the aerobic tank 130 is combined with organic components in the influent 2, so that nitrite nitrogen is denitrified. Accordingly, the ratio of ammonia nitrogen to nitrite nitrogen in the influent to be introduced from the second anoxic tank 140 to the re-aeration tank 150 may be adjusted in the range of 1:1.1 to 1.3.

The amount of return required and the influent distribution ratio are varied by the C/N ratio of the influent and the concentration of ammonia nitrogen ($NH_4^+$—N). Described below is an example in which the concentration of ammonia nitrogen ($NH_4^+$—N) in the influent is 40 mg/L.

The concentration of the BDCOD according to the C/N (BDCOD/$NH_4^+$—N) ratio when the concentration of ammonia nitrogen($NH_4^+$—N) in the influent is 40 mg/L, and the concentration of $NO_2^-$—N denitrifiable when the COD/$NO_2^-$—N ratio is 3.0 are shown as in Table 1 below. Table 1 shows the values for the case where the sedimentation site return rate (RAS) is 30%.

TABLE 1

| Types | value | | |
|---|---|---|---|
| C/N ratio | 1.0 | 1.5 | 2.0 |
| BDCOD(mg/L) | 40 | 60 | 80 |
| Denitritation concentration (mg/L) | 13 | 20 | 27 |
| Concentration (mg/L) of inorganic nitrogen in effluent from solid-liquid separator | 27 | 20 | 13 |
| Concentration (mg/L) of $NH_4$—N in effluent from solid-liquid separator | 11.6 | 8.7 | 5.8 |
| Concentration (mg/L) of $NO_2$—N in effluent from solid-liquid separator | 15.1 | 11.3 | 7.5 |
| Proportion (%) of sewage and wastewater introduced into second anoxic tank | 38 | 28 | 19 |
| Proportion (%) of sewage and wastewater introduced into anaerobic tank | 62 | 72 | 81 |
| Denitritation concentration (mg/L) in second anoxic tank | 5.0 | 5.7 | 5.0 |
| Denitritation concentration (mg/L) in anaerobic tank and first anoxic tank | 7.9 | 13.9 | 21.3 |
| Concentration (mg/L) of nitrite nitrogen supplied to first anoxic tank by RAS | 6.0 | 4.5 | 3.0 |
| Denitritation concentration (mg/L) in first anoxic tank | 1.9 | 9.4 | 18.2 |
| Concentration (mg/L) of $NH_4$—N in first anoxic tank | 31 | 31 | 31 |
| Internal return rate(IR) (%) | 12 | 36 | 63 |

The concentration of inorganic nitrogen in the effluent from the solid-liquid separation process can be calculated by excluding the amount denitritatable using organic matter in the influent from the total influent ammonia nitrogen. The concentrations of $NO_2^-$—N and $NH_4^+$—N can be calculated to allow the $NO_2^-$—N/$NH_4^+$—N ratio in the effluent in the solid-liquid separation process to be in the range of 1:1.1 to 1.3. In this case, since ammonia nitrogen is supplied by the proportion of sewage and wastewater fully introduced into the second anoxic tank, the proportion of sewage and wastewater introduced into the second anoxic tank may be obtained by the following equation.

$$\text{influent 2(\%)} = \frac{NH_4 - N \text{ concentration in effluent in solid} - \text{liquid separator} * \left(1 + \frac{RAS}{100}\right)}{NH_4 - N \text{ concentration in second influent}}$$

Here, influent 2 means the proportion of sewage and wastewater introduced into the second anoxic tank.

$$RAS(\%) = \frac{\text{amount of return from solid} - \text{liquid separator to anaerobic tank}}{\text{amount of influent to nitrogen and phosphorus removal device}}$$

The proportion of sewage and wastewater introduced into the anaerobic tank may be easily calculated according to the following equation, using the proportion of sewage and wastewater introduced into the second anoxic tank obtained above.

$$\text{influent 1(\%)} = \left(1 - \frac{\text{influent 2(\%)}}{100}\right) * 100$$

Here, influent 1 means the proportion of sewage and wastewater introduced into the anaerobic tank.

Since the proportions of sewage and wastewater introduced into the anaerobic tank and the second anoxic tank are determined, the denitritatable concentration according to each influent is determined according to the following equation.

$$\text{denitritation concentration} \left(\frac{mg}{L}\right) \text{in second anoxic tank} =$$
$$\text{denitritation concentration} \left(\frac{mg}{L}\right) \text{in entire device} * \frac{\text{influent 2(\%)}}{100}$$

Here, denitritation concentration in entire device means the concentration of nitrite nitrogen removed in the entire nitrogen and phosphorus removal device 100.

The concentration of nitrite nitrogen removed in the anaerobic tank and the first anoxic tank is obtained from the following equation.

$$\text{denitritation concentration} \left(\frac{mg}{L}\right) \text{in anaerobic tank and first anoxic tank} =$$
$$\text{denitritation concentration}\left(\frac{mg}{L}\right) \text{in entire device} -$$
$$\text{denitritation concentration}\left(\frac{mg}{L}\right) \text{in second anoxic tank}$$

The concentration of nitrite nitrogen introduced into the anaerobic tank is calculated by the sludge return rate (RAS) and the concentration of nitrite nitrogen in the effluent from the solid-liquid separator.

$$\text{concentration} \left(\frac{mg}{L}\right) \text{of } NO_2-N \text{ introduced into anaerobic tank} =$$
$$NO_2-N\left(\frac{mg}{L}\right) \text{in effluent from solid}-\text{liquid separator} * \frac{RAS}{100}$$

By the above values, the concentration of nitrite nitrogen denitrified in the first anoxic tank is obtained. The internal return amount using this value is calculated according to the following equation.

$$\text{internal return rate(\%)} = \frac{\text{concentration of } NO_2-N \text{ denitrified in first anoxic tank}}{\text{concentration of } NH_4-N \text{ in first anoxic tank}}$$

Here, the concentration of ammonia nitrogen in the first anoxic tank is calculated according to the following equation.

$$\text{concentration} \left(\frac{mg}{L}\right) \text{of } NH_4-N \text{ in first anoxic tank} =$$

$$\frac{\frac{RAS}{100} * NH_4-N \text{ concentration} \left(\frac{mg}{L}\right) \text{in effluent from solid}-\text{liquid separator} + NH_4-N \text{ concentration} \left(\frac{mg}{L}\right) \text{in first influent}}{\frac{RAS}{100} + \frac{\text{influent 1(\%)}}{100}}$$

The re-aeration tank 150 re-aerates the effluent from the anoxic tank, using air. The re-aeration tank 150 re-aerates by supplying air to the influent for a preset period of time so as to enhance the sedimentation characteristics of sludge so that the solid-liquid separation may occur smoothly in the solid-liquid separator 160.

The solid-liquid separator 160 separates the PAB which have re-ingested phosphorus and discharges the solid-liquid separated influent to the anaerobic ammonium oxidation tank 170.

The solid-liquid separator 160 separates the PAB which have up-taken phosphorus and returns the sludge to the anaerobic tank 110. The amount of sludge returned may be adjusted according to the height of the interface of the solids in the solid-liquid separator 160, and the height of the interface may be adjusted not to exceed 30% of the total solid-liquid separation depth. The appropriate amount of sludge returned is 30%-50% of the amount of sewage introduced, but if solid-liquid separation is poor, the amount of sludge returned may increase.

Further, since the nitrogen returned through the sludge by the solid-liquid separator 160 is not 100% nitrate nitrogen but ammonia nitrogen and nitrite nitrogen are in the range of 1:1.1 to 1.3, the anaerobic environment of the anaerobic tank 110 is less damaged. Therefore, the influence on the elution of phosphorus in the anaerobic tank 110 is reduced as compared to that by the conventional process.

The anaerobic ammonium oxidation tank 170 removes nitrogen by denitrification during the process of oxidizing ammonia nitrogen using ANAMMOX bacteria. The anaerobic ammonium oxidation tank 170 contains anammox bacteria and denitrifies ammonia nitrogen and nitrite nitrogen, in a ratio of 1:1.32, to nitrogen gas.

Figure 2:
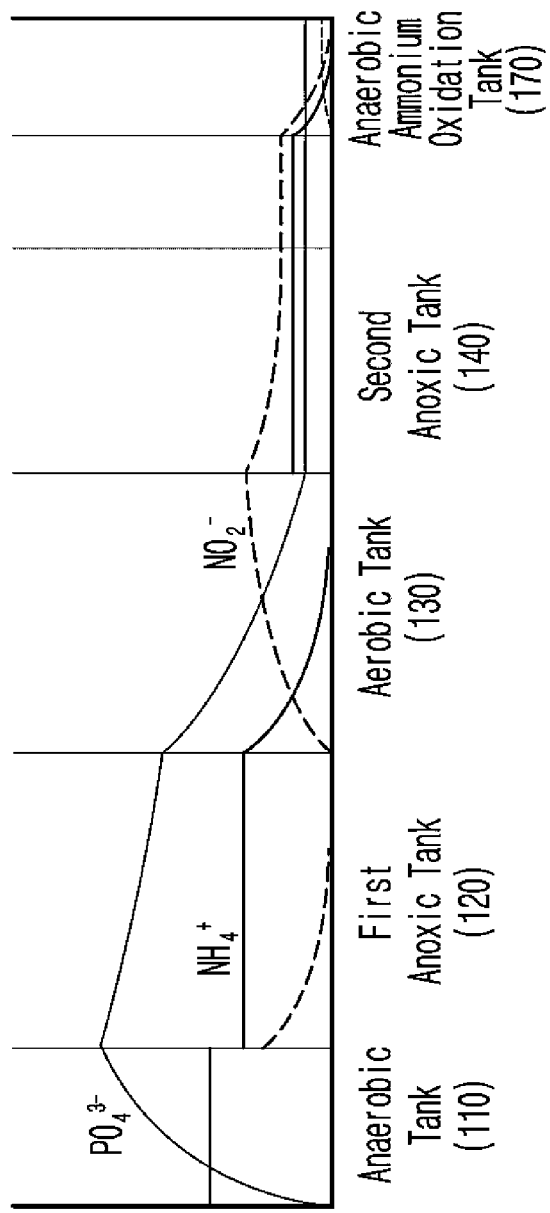
FIG. 2 is a graph illustrating changes in the concentrations of nitrogen and phosphorus in each component in a nitrogen and phosphorus removal device according to an embodiment of the present invention.

FIG. 2 is a graph illustrating changes in the concentrations of nitrogen and phosphorus in each component in a nitrogen and phosphorus removal device according to an embodiment of the present invention.

Since the sludge returned from the solid-liquid separator 160 and the influent 1 are introduced, the anaerobic tank 110 has a certain concentration of ammonia nitrogen. Meanwhile, in the anaerobic tank 110, since the releasing of phosphorus is caused by PAB, the concentration of phosphorus sharply increases.

In the first anoxic tank 120, ammonia nitrogen and phosphorus are diluted by the return from the aerobic tank 130 and, thus, their concentrations are reduced to certain concentrations. Meanwhile, since nitrite nitrogen is internally returned from the aerobic tank 130, a certain concentration of nitrite nitrogen exists. Since nitrite nitrogen is denitrified through organic matter oxidation, the concentration of nitrite nitrogen approaches zero.

Since all ammonia nitrogen is oxidized to nitrite nitrogen in the aerobic tank 130, the concentration of ammonia nitrogen becomes 0, but the concentration of nitrite nitrogen increases. Meanwhile, since the PAB up-take the released phosphorus in the aerobic tank 130, the concentration of phosphorus in the aerobic tank 130 is sharply decreased.

The second influent is introduced into the second anoxic tank 140, and due to the ammonia nitrogen component contained in the influent 2, the second anoxic tank 140 has a certain concentration of ammonia nitrogen. In contrast, since the nitrite nitrogen component is denitrified by oxidizing the organic matter contained in the second influent, the concentration of nitrite nitrogen is partially reduced. However, since ammonia nitrogen present in the second anoxic tank 140 needs to be denitrified in the anaerobic ammonium oxidation tank 170, nitrite nitrogen is not fully denitrified in the second anoxic tank 140 but remains at the concentration 1.32 times higher than that of ammonia nitrogen present in the second anoxic tank 140.

In the anaerobic ammonium oxidation tank 170, both ammonia nitrogen and nitrite nitrogen are removed by the anammox reaction.

Figure 3:
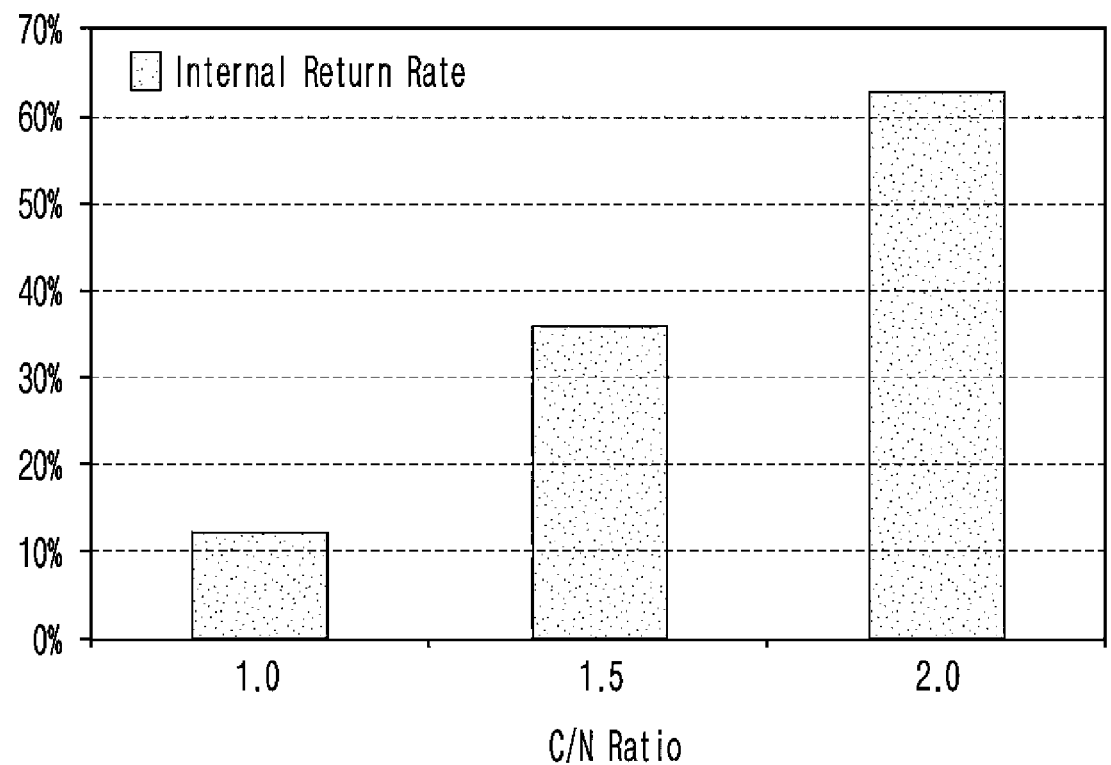
FIG. 3 is a graph illustrating the amount of influent returned according to the ratio of organic matter to nitrogen in first treated water in a nitrogen and phosphorus removal device according to an embodiment of the present invention.
Figure 4:
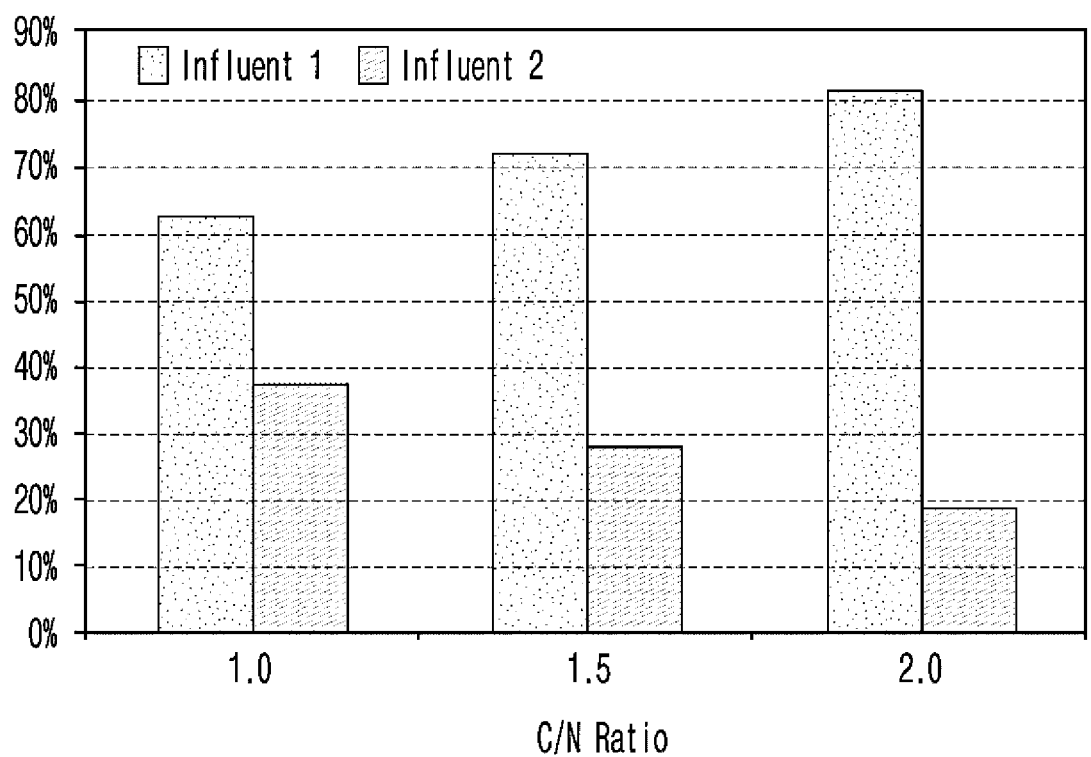
FIG. 4 is a graph illustrating the amounts of a first influent and a second influent separated, according to the ratio of organic matter to nitrogen in first treated water in a nitrogen and phosphorus removal device according to an embodiment of the present invention.

FIG. 3 is a graph illustrating the amount of influent returned according to the ratio of organic matter to nitrogen in primary effluent in a nitrogen and phosphorus removal device according to an embodiment of the present invention. FIG. 4 is a graph illustrating the amounts of a influent 1 and a influent 2 separated, according to the ratio of organic matter to nitrogen in primary effluent in a nitrogen and phosphorus removal device according to an embodiment of the present invention.

Referring to FIG. 3, as the ratio of organic matter to nitrogen in the primary effluent introduced into the nitrogen and phosphorus removal device 100 increases, the amount of influent returned increases. An increase in the ratio of organic matter to nitrogen means that in the same amount of treated water, the concentration of organic matter increases while the concentration of ammonia nitrogen decreases. Accordingly, to increase the concentration of nitrogen denitrified by combining with organic matter contained in the influent 1 or 2, the nitrogen and phosphorus removal device 100 increases the amount returned.

Further, referring to FIG. 4, as the ratio of organic matter to nitrogen in the primary effluent introduced into the nitrogen and phosphorus removal device 100 increases, the amount separated into the influent 1 increases. As the concentration of the organic material increases, the nitrogen and phosphorus removal device 100 increases the amount separated into the influent 1 to increase the concentration of the organic matter involved in denitrification and nitrite nitrogen while passing through the first anoxic tank 120 and the second anoxic tank 140.

Figure 5:
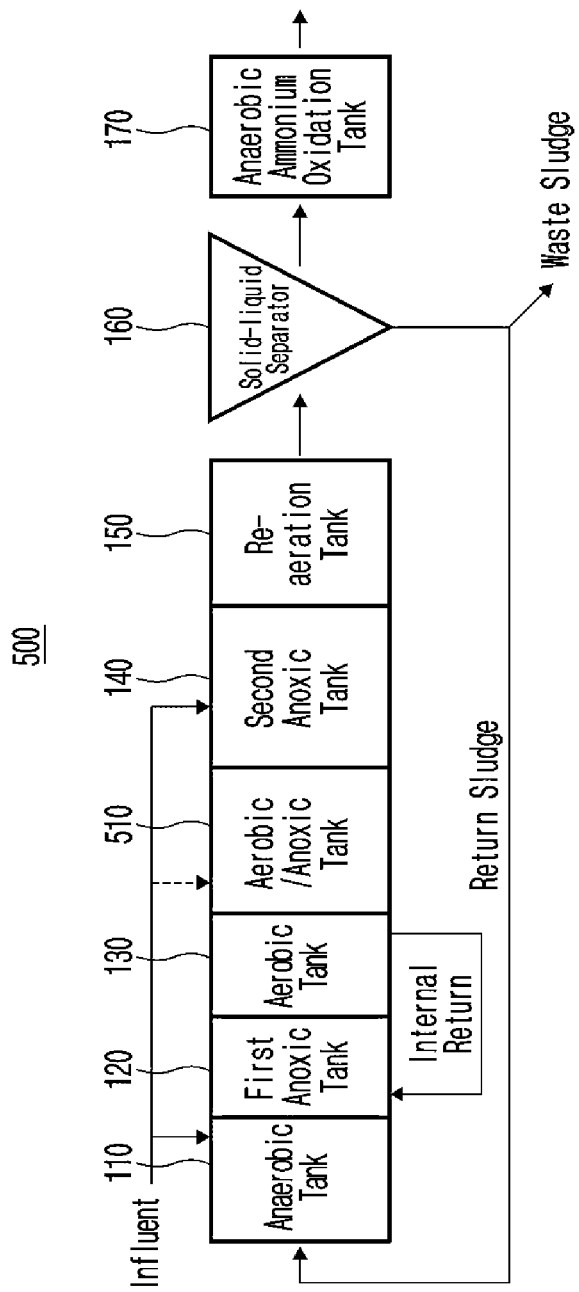
FIG. 5 shows an example in which a nitrogen and phosphorus removal device is applied to a conventional treatment plant according to an embodiment of the present invention.

FIG. 5 is a view illustrating an example in which a nitrogen and phosphorus removal device is applied to a conventional treatment plant according to an embodiment of the present invention. According to an embodiment of the present invention, when the nitrogen and phosphorus removal device 100 is applied to a conventional treatment plant, the reactor may be utilized. A variable tank (an aerobic/anoxic tank 510 described below) is included to increase the convenience of operation.

Referring to FIG. 5, the nitrogen and phosphorus removal device 100 further includes an aerobic/anoxic tank 510. The aerobic/anoxic tank 510 is operated to be varied as an aerobic or anoxic tank depending on the operating conditions. In general, in the winter season when water temperature drops and the nitrification efficiency decreases, the aerobic/anoxic tank 510 may be operated as an aerobic tank and, in the summer season when nitrification smoothly occurs, the aerobic/anoxic tank 510 may be operated as an anoxic tank.

The aerobic/anoxic tank 510 is placed between the aerobic tank 130 and the second anoxic tank 140. However, the present invention is not necessarily limited thereto, and the aerobic/anoxic tank 510 may be placed in a different position depending on the operating conditions of the nitrogen and phosphorus removal device 100.

According to an embodiment of the present invention, the nitrogen and phosphorus removal device passes through nitrite nitrogen ($NO_2^-$—N) instead of nitrate nitrogen ($NO_3^-$—N), thus inducing a denitritation reaction in the anoxic tank and a nitritation reaction in the aerobic tank. Accordingly, since the nitrogen and phosphorus removal device requires only 75% oxygen compared to devices passing through nitrate nitrogen, it is possible to save aeration energy.

Further, according to an embodiment of the present invention, the nitrogen and phosphorus removal device passes through nitrite nitrogen ($NO_2^-$—N) and may thus be easily combined with an anaerobic ammonium oxidation (or, 'anammox') process. Therefore, according to an embodiment of the present invention, the nitrogen and phosphorus removal device may treat sewage and wastewater containing a low concentration of organic matter and, in particular, may economically treat wastewater containing a high concentration of nitrogen.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A device for removing nutrients in sewage and wastewater, the device comprising:
    an anaerobic tank receiving a portion of the sewage and wastewater and releasing phosphorus dissolved in the received portion of the sewage and wastewater;
    a first anoxic tank performing denitrification by combining nitrite nitrogen with organic matter in the received portion of the sewage and wastewater;
    an aerobic tank inducing up-taking of the phosphorus eluted in the anaerobic tank using first bacteria and oxidizing ammonia nitrogen in the received portion of the sewage and wastewater to nitrite nitrogen;
    a second anoxic tank receiving a rest of the sewage and wastewater and denitrifying the nitrite nitrogen oxidized in the aerobic tank;
    a re-aeration tank performing re-aeration using an air;
    a solid-liquid separator separating bacteria ingesting the phosphorus in the sewage and wastewater that has passed through the second anoxic tank; and
    an anaerobic ammonium oxidation tank denitrifying the nitrite nitrogen oxidized in the aerobic tank and ammonia nitrogen not oxidized in the aerobic tank, using second bacteria,
    wherein a predetermined proportion of sludge is returned from the solid-liquid separator to the anaerobic tank;
    wherein the aerobic tank returns a portion of the oxidized nitrite nitrogen to the first anoxic tank;
    wherein the proportion of sewage and wastewater introduced into the second anoxic tank is $$\frac{\text{NH}_4 - \text{N concentration in effluent in solid} - \text{liquid seperator} * \left(1 + \frac{RAS}{100}\right)}{\text{NH}_4 - \text{N concentration in second influent}};$$

wherein an internal return rate of nitrite nitrogen from the aerobic tank to the first anoxic tank is $$\frac{\text{concentration of NO}_2 - \text{N denitrified in first anoxic tank}}{\text{concentration of NH}_4 - \text{N in first anoxic tank}};$$

denitritation concentration of nitrite nitrogen in second anoxic tank is denitritation concentration in the device× the proportion of sewage and wastewater introduced into the second anoxic tank; and the RAS is $$\frac{\text{amount of return from solid} - \text{liquid seperator to anaerobic tank}}{\text{ammount of influent to nitrogen and phosphorus removal device}} \times 100.$$

* * * * *